E. G. DANN.
LUBRICATING STRIP FOR LEAF SPRINGS.
APPLICATION FILED JAN. 2, 1914.
1,143,812. Patented June 22, 1915.
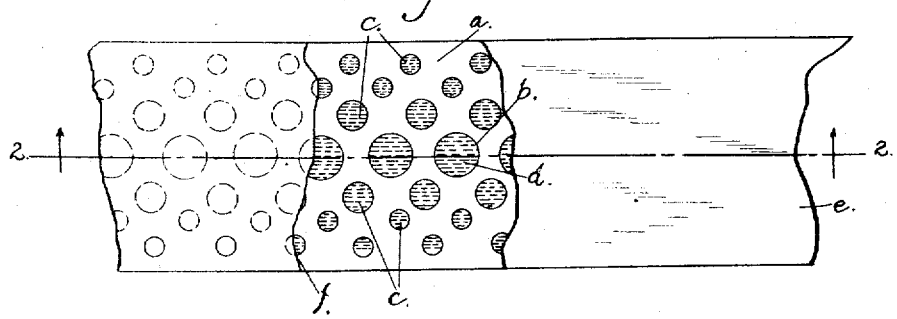
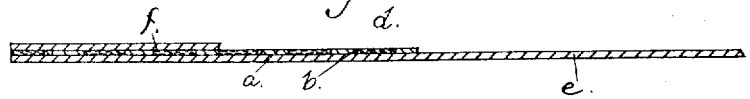
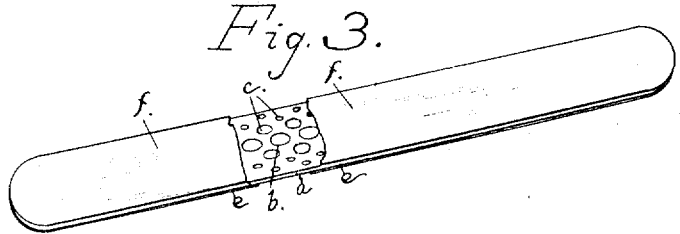
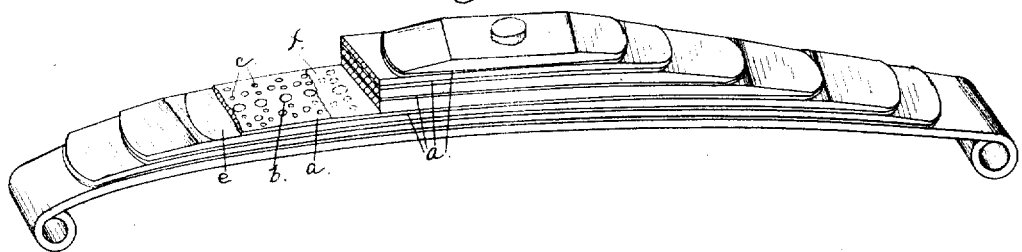

UNITED STATES PATENT OFFICE.

ERNEST G. DANN, OF CHICAGO, ILLINOIS.

LUBRICATING-STRIP FOR LEAF-SPRINGS.

1,143,812.  Specification of Letters Patent.  Patented June 22, 1915.

Application filed January 2, 1914. Serial No. 810,074.

*To all whom it may concern:*

Be it known that I, ERNEST G. DANN, a citizen of the United States, residing at Chicago, in the county of Cook and State of Illinois, have invented certain new and useful Improvements in Lubricating-Strips for Leaf-Springs, of which the following is a specification.

My invention relates to a lubricating strip or element adapted primarily to be placed between the leaves of a compound leaf spring such as the elliptical or semielliptical springs commonly used for supporting vehicle bodies on their running gear. A lubricating strip of this sort, when placed between the leaves of a compound leaf spring, adds to the resiliency of the spring and also to its life by keeping lubricated the contacting surfaces of the leaves which, of course, have a certain amount of relative movement when the spring is flexed. Such a lubricating strip must meet certain requirements before it is possible to utilize to the best advantage this expedient of interleaving a compound spring with lubricant carrying laminæ. If the perforations or pockets in the lubricating strips or elements are filled at the time the spring is assembled, the operation is tedious and expensive. If, on the other hand, the strips are filled with the lubricant in advance, the lubricant is apt to drop or work out of the perforations or pockets in transportation or in the operation of assembling, which latter necessarily involves the bending of the strips, and this is the case particularly in warm weather or when the work is done in a warm room. Furthermore, the filling of the strips at any time, if they are handled as separate articles, is slow, difficult and costly.

My invention has for its primary object to provide an improved lubricating element of the general type noted, but constituted so that it will reliably retain the lubricant in the pockets under all ordinary conditions and at all ordinary temperatures shall be cleanly to handle, and so that such element, or the strip from which the same is cut, may be stored, shipped and handled in assembling with the leaves of the spring without danger of injury thereto or deterioration.

The invention has for further objects such other new and improved constructions, arrangements, devices and expedients relating to lubricating material suitable for use in compound springs or in other analogous situations, as will be hereinafter described and claimed.

In the accompanying drawings I have shown a preferred form of lubricating strip made in accordance with the invention.

In the drawings Figure 1 is a fragmentary plan view of the lubricating strip, successive laminæ being broken away to show the structure of the article; Fig. 2, a sectional view taken on line 2—2 of Fig. 1; Fig. 3, a view, in perspective, of the lubricating element ready to be placed between the leaves of a semi-elliptical spring, the upper covering strip being broken away in one place; and Fig. 4, a broken view, in perspective, of a spring provided with such lubricating elements arranged between the leaves thereof.

Like characters of reference designate like parts in the several figures of the drawings.

The preferred form of lubricating strip shown comprises a thin strip of metal $a$ formed with a plurality of perforations, preferably with a central row of perforations $b$ and on opposite sides of this several rows of perforations of smaller diameter designated $c$. The perforations $b$ and $c$ are filled with a lubricating substance $d$. The element comprises further covering films or strips $e$, $f$, preferably made of paper or other thin material which are caused to adhere to the metal strip, preferably through the agency of the lubricant alone. These strips or films are of such character as to readily disintegrate under the abrasive action of the leaves of the spring. For the lubricant I use some lubricating substance, the melting point of which is relatively high. This substance is preferably melted by heat and run on to the strip so as to fill the perforations or pockets therein; and the filled carrier strip with its covering strips $e$, $f$ is then passed through rolls, or otherwise compressed so that the paper strips are caused to adhere firmly and with relative permanency to the metal strip which they cover. A material made up in this manner is not affected by any ordinarily high temperature, it can be readily shipped in bulk, for example, in rolls or wound on spools, to the manufacturer of the springs, and it may be cut up, bent or otherwise handled without danger of having the lubricant escape from the perforations, either in shipment, storage, or when it is cut up and assembled in the spring. When placed between the leaves of a spring, as shown in Fig. 4, the paper coverings are quickly disintegrated by the abrasive action of the springs, and, being thoroughly saturated with the lubricant, and in fact, uniting with it upon disintegration, they do not diminish or injuriously affect the intended function of the device.

While I have described my invention in a certain preferred embodiment, modifications might be made without departing from the principle of the invention. Therefore, I do not wish to be understood as limiting the invention to the particular constructions, arrangements, devices and expedients shown and described, except so far as these several constructions, arrangements, devices and expedients are specifically made limitations in the claims herein.

I claim:

1. A lubricating element for a compound spring comprising a lubricant carrier formed with pockets, a lubricating substance in said pockets, and an adherent covering for said pockets.

2. A lubricating element for a compound spring comprising a lubricant carrier formed with pockets, a lubricating substance in said pockets, and an adherent disintegrable covering for said pockets.

3. A lubricating element for a compound spring comprising a perforated metal strip, a lubricating substance in the perforations of said strip, and adherent coverings on opposite sides of said metal strip.

4. A lubricating element for a compound spring comprising a perforated metal strip, a lubricating substance in the perforations of said strip, and adherent disintegrable covering strips on opposite sides of said metal strip.

5. A lubricating element for a compound spring comprising a perforated metal strip, a lubricating substance in the perforations of said strip, and strips of paper on opposite sides of the metal strip which are caused to adhere thereto by the lubricant.

6. A lubricating element comprising a metallic carrier adapted to contain a lubricating substance, a lubricating substance associated with the carrier, and an adherent covering to hold the lubricating substance in place in the carrier.

7. A lubricating element comprising a metallic carrier adapted to contain a lubricating substance, a lubricating substance associated with the carrier, and a disintegrable adherent covering to hold the lubricating substance in place in the carrier.

ERNEST G. DANN.

Witnesses:
L. A. FALKENBERG,
J. B. LAGORIO.

Copies of this patent may be obtained for five cents each, by addressing the "Commissioner of Patents, Washington, D. C."

It is hereby certified that in Letters Patent No. 1,143,812, granted June 22, 1915, upon the application of Ernest G. Dann, Chicago, Illinois, for an improvement in "Lubricating-Strips for Leaf-Springs," errors appear in the printed specification requiring correction as follows: Page 1, lines 48–49, strike out the words and comma "shall be cleanly to handle, and"; same page, line 50, before the word "may" insert the words and comma *shall be cleanly to handle, and;* and that the said Letters Patent should be read with these corrections therein that the same may conform to the record of the case in the Patent Office.

Signed and sealed this 24th day of August, A. D., 1915.

[SEAL.]

J. T. NEWTON,
*Acting Commissioner of Patents.*